Dec. 15, 1970   M. JEAN-CHARLES VILLANEAU   3,546,830
PREFABRICATED REINFORCED CONCRETE FLOORING
SLABS AND FLOORS AS THUS FORMED
Filed Feb. 13, 1968   5 Sheets-Sheet 1
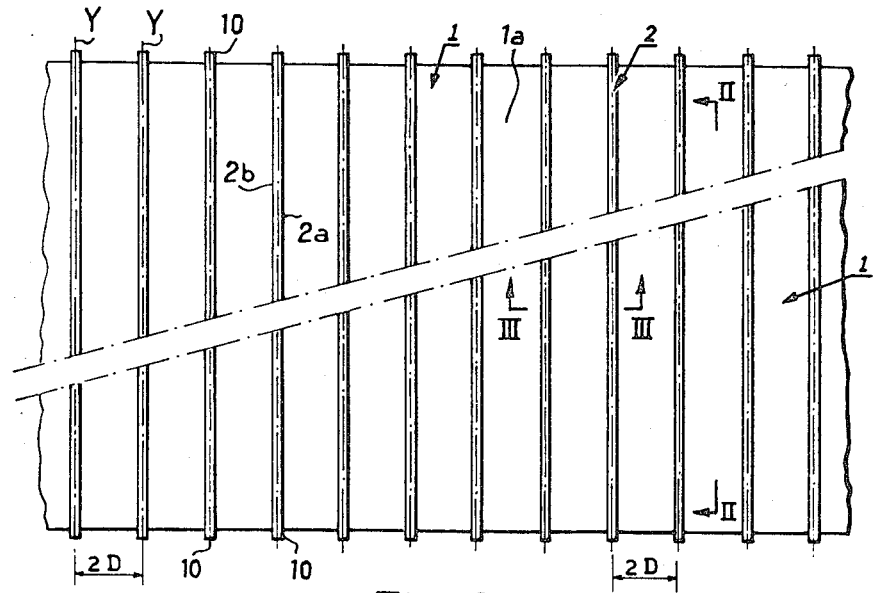
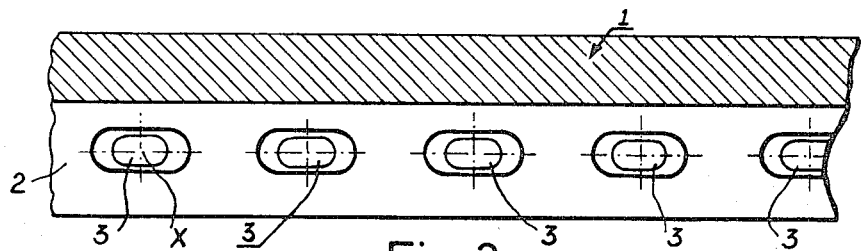
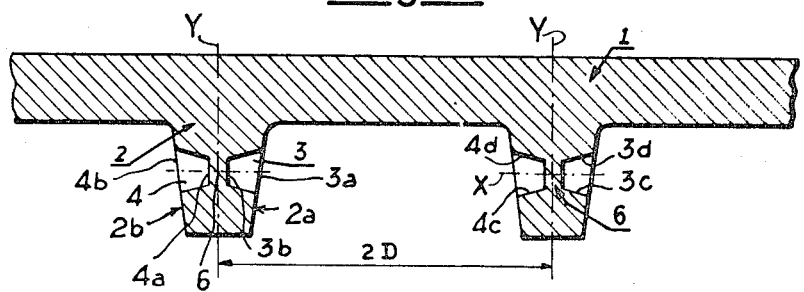
INVENTOR:
MICHEL J.C. VILLANEAU
BY Breitenfeld & Levine
ATTORNEYS

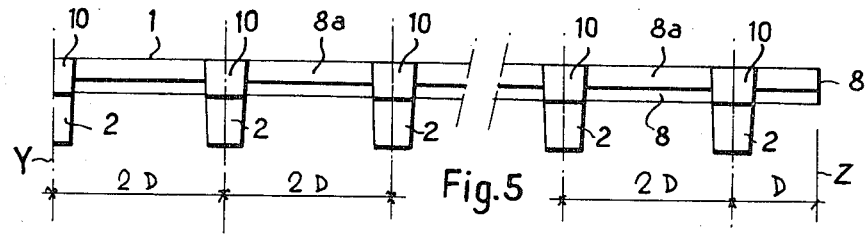
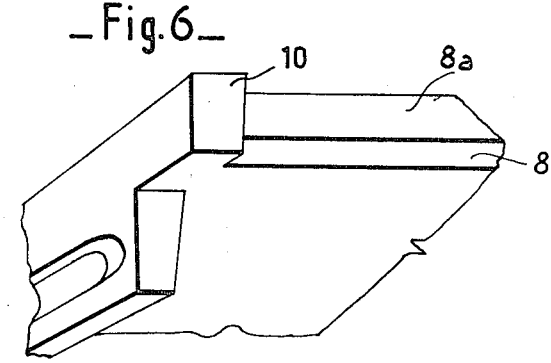
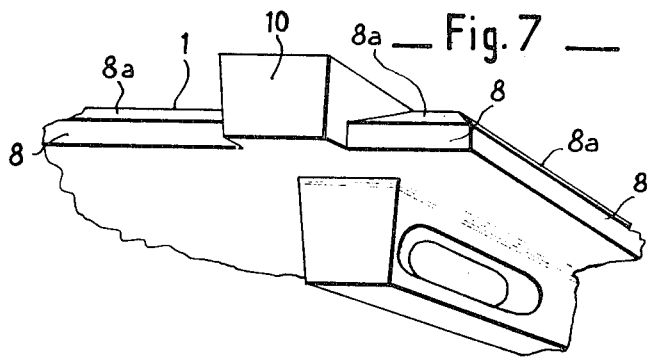
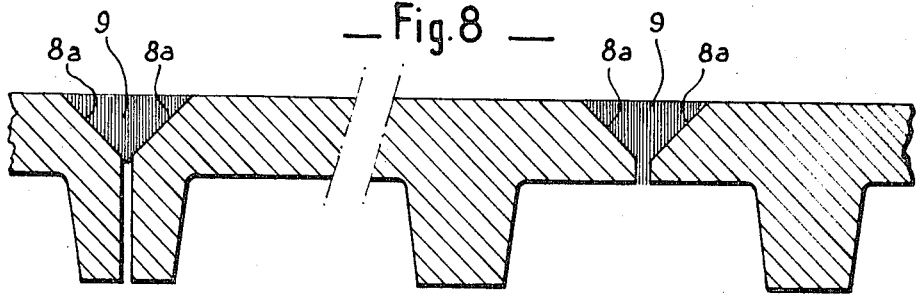

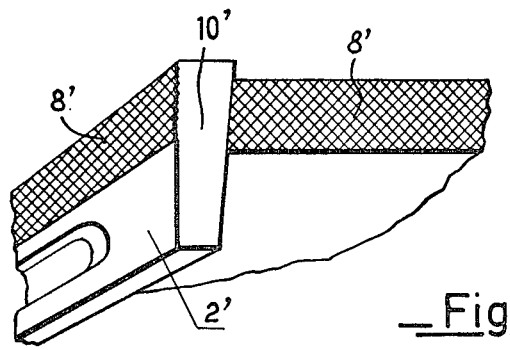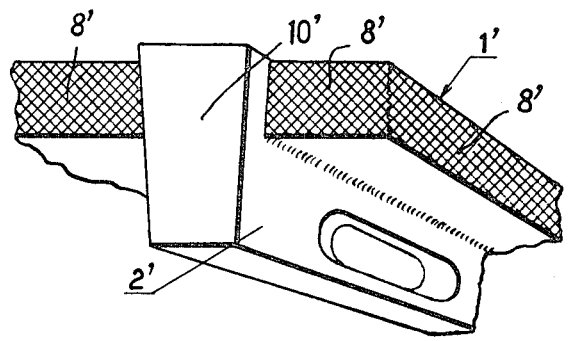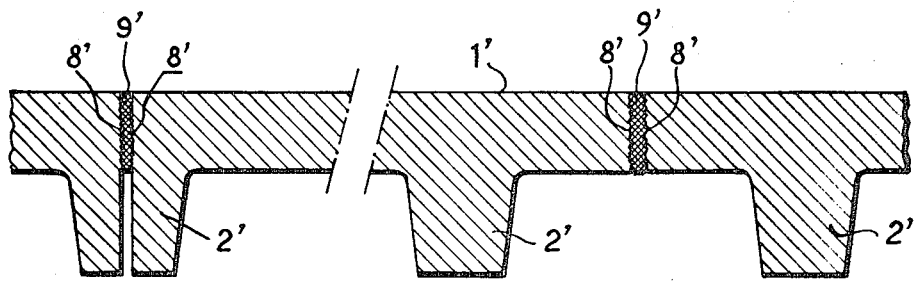

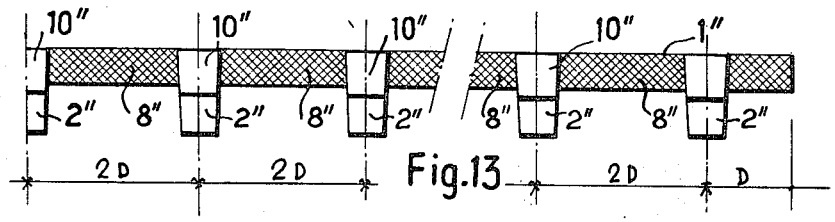
Fig. 13
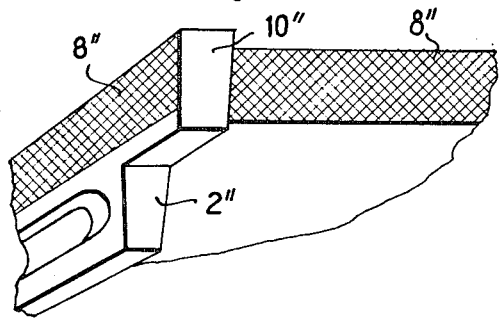
Fig. 14
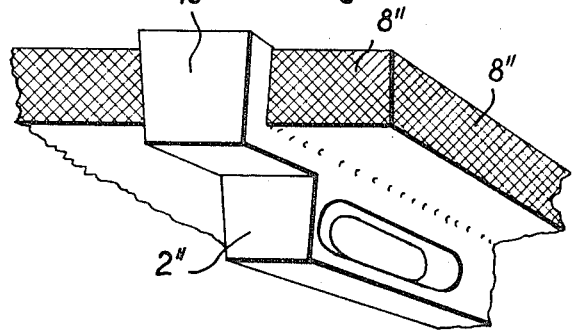
Fig. 15
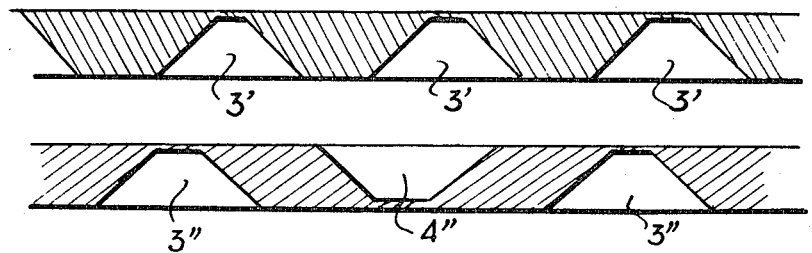
Fig. 16
Fig. 17
INVENTOR:
MICHEL J.C. VILLANEAU
BY Breitenfeld & Levine
ATTORNEYS US United States Patent Office 3,546,830
Patented Dec. 15, 1970

3,546,830
PREFABRICATED REINFORCED CONCRETE FLOORING SLABS AND FLOORS AS THUS FORMED
Michel Jean-Charles Villaneau, Paris, France, assignor to Societe de Travaux pour la Construction et l'habitat industriels Tracoba, Paris, France, a company of France
Filed Feb. 13, 1968, Ser. No. 705,098
Claims priority, application France, Feb. 20, 1967, 1,511,948
Int. Cl. E04b *1/00, 5/48*
U.S. Cl. 52—100                                    9 Claims

ABSTRACT OF THE DISCLOSURE

A flooring slab prefabricated from reinforced concrete has ribs projecting from one face of a compression bed with recesses formed in at least some of the ribs, each recess having a base which can be destroyed by a hammer blow to afford communication between one face of the rib and the other to permit the passage of a water pipe, gas pipe or the like where desired.

BACKGROUND OF THE INVENTION

The present invention relates to prefabricated reinforced concrete flooring slabs and the floors which are formed by means of these slabs.

The problem frequently arises of forming a network of fluid pipes for industrial or domestic use (water pipes, gas pipes, etc.), parallel to the surface of a reinforced concrete floor and different methods are employed for resolving this problem.

In one of these methods, the network of pipes is situated beneath or on the floor, with the disadvantage that the thickness of the floor is increased by that of the pipe network.

In order to overcome this disadvantage, in accordance with another method in use at present, the network is incorporated at the time of prefabrication within the floor itself, the flooring slabs comprising different conduits incorporated during the casting. This second method has the disadvantage of necessitating the use of different prefabricated slabs made with specific measurements, so as to prevent any subsequent modification of the network.

SUMMARY OF THE INVENTION

The present invention has for its object to provide prefabricated reinforced concrete flooring slabs which make it possible for the floor to be constructed by means of slabs of a single type, while enabling the pipe network to be situated actually in the floor and for the root of this network to be modified at will.

According to the invention, the prefabricated reinforced concrete flooring slab comprises a compression bed and ribs which project from one face of the said bed, certain at least of these ribs each having two longitudinal lateral faces and a plurality of recesses distributed at regular intervals along the rib, each recess opening with an opening end on any one of the said faces, said recesses extending into the rib in the direction of the other of said faces and ending in a base, which can be knocked out as required by a hammer blow to permit the passage of an element of a network which is to be arranged in the floor.

The invention will be best understood from the following description, and by reference to the accompanying figures, concerning embodiments of the slab according to the invention, and other features and advantages of the invention will become apparent from reading the said description.

BRIEF DESCRIPTION OF THE DRAWINGS AND DETAILED DESCRIPTION

FIG. 1 is a diagrammatic view of the underside of a ribbed slab according to the invention;

FIG. 2 is an enlarged sectional view of a part of the slab shown in FIG. 1, along the line II—II of this figure, said section being vertical and parallel to the length of the ribs;

FIG. 3 is an enlarged sectional view of a part of the slab shown in FIG. 1, taken on the line III—III of this figure, said section being vertical and parallel to the width of the ribs;

FIG. 5 is a diagrammatic end view of one constructional form of the slab, the viewing plane being parallel to the width of the ribs;

FIG. 6 is a perspective view of a part of that end of the slab shown in FIG. 5 which is seen on the left in this figure;

FIG. 7 is a perspective view of that end of the slab shown in FIG. 5 which is seen on the right in this figure;

FIG. 8 is a diagrammatic vertical section in a plane extending through the width of the ribs and showing an assembly of three slabs of the type shown in FIG. 5;

FIG. 10 is a view corresponding to FIG. 6, but with the slab shown in FIG. 9;

FIG. 11 is a view corresponding to FIG. 7, but with the slab of FIG. 9;

FIG. 12 is a view corresponding to FIG. 8, showing an assembly of slabs of the type shown in FIG. 9;

FIG. 13 is a view corresponding to FIG. 5, but using another constructional form of the slab;

FIG. 14 is a view corresponding to FIG. 6, but using the slab shown in FIG. 13;

FIG. 15 is a view corresponding to FIG. 11, but using the slab shown in FIG. 13;

FIG. 16 is a view corresponding to FIG. 4, but using a modified form of construction of the recesses in a rib, and FIG. 17 is a view corresponding to FIG. 4, but using another constructional form of the recesses in a rib.

Figure 4:
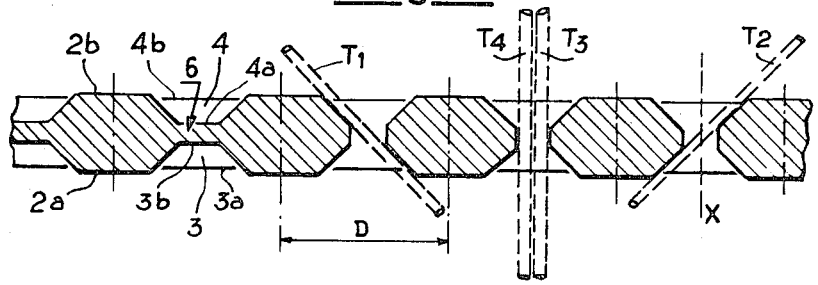
FIG. 4 is an enlarged sectional view of a rib in a horizontal plane extending at the level of the axes of the recesses in the rib.

The slab according to the invention, as shown in FIGS. 1 to 4, is a cast concrete block having a part 1 which forms a compression bed and a plurality of ribs 2 which project relatively to the bed 1 and which are spaced from one another at appropriate intervals. The slab can be used with the projecting ribs beneath the compression bed, as in the example illustrated, or with the ribs projecting above the compression bed.

In the preferred embodiment as illustrated, the ribs 2 are parallel to one another and their longitudinal axes Y are separated by intervals of constant width. Each rib 2 has two longitudinal lateral faces $2a$ and $2b$ which between them define the width of the rib.

Each rib 2 comprises a series of recesses 3 arranged at intervals along the rib and each terminating with an open end $3a$ on one ($2a$) of the longitudinal lateral faces of the rib, and another series of recesses 4 arranged at intervals along the rib and each terminating in an open end $4b$ on the other ($2b$) of the longitudinal lateral faces of the rib, each recess 3 of the said series or row being opposite a recess 4 of the other series or row, the respective base ends $3b$ and $4a$ of two recesses being thus opposite one another and only being separated by a common base wall 6 which is sufficiently thin to be knocked out as required by a hammer blow.

The recesses are obtained at the time of casting, the walls of the moulds having bosses of corresponding shapes. The concrete thus saved represents not inconsiderable quantities.

The recesses have a width and a depth corresponding to the dimensions of the network elements (electricity, heating, gas, etc.), to be subsequently incorporated into the floor which will be formed by the assembly of the slabs.

The said elements, comprising particularly wires and pipes, will pass through the ribs by way of certain of the recesses and could also be arranged between the ribs, the elements thus being in all cases contained in the thickness of the floor.

Preferably, and as illustrated, the section of a recess decreases from the opening towards the base of the recess.

For example, the section of the recess in a horizontal plane has the form of an isosceles trapezium, the sides of which are substantially inclined at 45° or more relatively to the major base of the trapezium (FIG. 4).

This shaping makes it possible, after destroying the wall which separates the bases of two opposite recesses, for a standard pipe to be caused to pass horizontally and at 45° through these two recesses and thus through the rib (as shown with the pipes T1 and T2 in FIG. 4).

In addition, it is advantageous for the base of the recess to be given a section which is just sufficient for two standard pipes to be able conveniently to pass together and horizontally through the base of the recess (as with the pipes T3 and T4 in FIG. 4).

These recesses of general truncated pyramidal form are preferred, because they permit, for a minimum recess volume, of passing through the recess either a standard pipe in any desired direction which is between a cone with an apex angle of 90° at the axis X of the recess, or two standard pipes side-by-side and parallel to the axis of the recess.

By "standard" pipe there is understood, in the case of floors of rooms, a pipe having a diameter of about 40 mm.

It is to be noted that the upper walls 3d and 4d and the lower walls 3c and 4c of the recesses can be horizontal if the network of pipes is itself horizontal.

It is proposed according to the invention to respect, between the vertical planes passing through the axes X of two consecutive recesses of a groove, a constant interval D which is substantially half the constant interval 2D existing between the vertical planes passing through the axes Y of two consecutive ribs.

In an existing construction, the spacing D is fixed at 30 cm. (or 1 foot) and a value which is between about 1 and 2 cm. (or between ½ inch and 1 inch) is chosen for the thickness of the base wall 6.

The prefabricated slabs have a width designed as a function of the span and the maximum weight compatible with the means available for positioning them. They can be cut either in the vertical plane passing through the axis Y of a rib (as in the case of the end seen on the left of FIG. 5 and in the case of FIG. 6), or in a mean vertical plane Z extending equidistantly from two ribs (as in the case of the end seen on the right in FIG. 5 and in the case of FIG. 7).

By way of indication, a standard slab based on the interval or spacing 2D=60 cm. (or 2 feet) comprises 3 or 4 ribs and its weight is about 6 tons for a length of 7 metres, the area of one slab being between 10 and 20 square metres.

The construction of the floor can be carried out by assembling the slabs with interposition of reinforced concrete joints in accordance with the usual regulations.

FIGS. 6 to 8 are concerned with such a conventional assembly, for which the edges 8 of the compression bed 1 are formed with inclined faces 8a, the said inclined faces of the edges facing one another on two adjoining slabs forming V-shaped channels 9 for receiving the concrete joint.

However, as the establishment of such assembly joints in reinforced concrete presents numerous disadvantages both in manufacture (complex edge contours, reserve of reinforcements, etc.) and in erection (joint shutterings, casting in situ, cracking at right-angles to supports, connection of networks or mains etc.), the invention is also concerned with avoiding these disadvantages.

For this purpose, and as shown in FIGS. 9 to 12, which correspond respectively to FIGS. 5 to 8, the edges 8' of the compression bed 1' are provided according to the invention with rough vertical faces 8', i.e. striated or grained faces, on the periphery of the prefabricated slab, so that when the slabs are assembled, these faces assist the adherence of a non-shrinking or preferably expansive, high-strength bonding mortar 9' which is poured between the facing edges.

These faces 8', arranged over the height of the compression bed, are either formed directly during the moulding by using striated shuttering profiles, or by subsequent treatment of the edges by sanding, roughening, washing, etc.

According to another feature of the invention, it is proposed to extend the ribs beyond the supporting edges of the slabs so as to form spurs capable of providing a provisional support at the time of laying, the extensions having for example a length of a few centimetres.

In the constructional form as shown in FIGS. 5 to 8, only that rib portion 2 which is in the compression bed is extended at 10 beyond the supporting edge 8.

In the constructional form shown in FIGS. 9 to 12, the ribs 2' are extended at 10' over their entire height.

Figure 9:
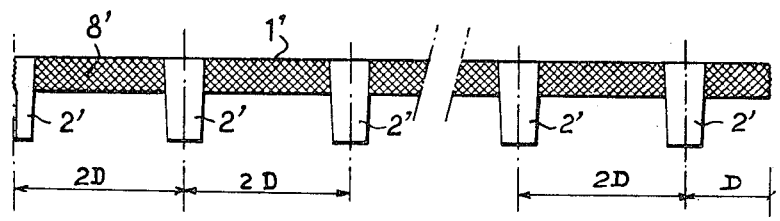
FIG. 9 is a view corresponding to FIG. 5, but with a modified embodiment of the slab.

In an intermediate constructional form as shown in FIGS. 13 to 15, which correspond to FIGS. 9 to 11, respectively, the rib portion which is in the compression table and a fraction only of the rib portion which projects in relation to the compression table are extended at 10" beyond the support edge 8" of the slab.

As already indicated above, the base wall 6 which is common to two opposite coaxial recesses can be knocked out by impact as required for the passage of a wire or a pipe.

This makes it possible for the base wall of the recesses only to be removed when this is required, and for the said wall to be retained when the removal thereof is unnecessary, and this enables the propagation of sound in the floor to be reduced.

However, in certain cases, it is possible to visualise systemmatically destroying the base walls at the time of manufacture, if practically all these walls are intended to be destroyed for the positioning of the pipe network, or if the above acoustic requirement is not necessary.

In certain cases, it is moreover possible to omit one of the two rows of recesses of one or several ribs, while always ensuring that the base walls of the recesses of the remaining row can always be destroyed as required by percussion.

This can be obtained by increasing the depth of the recesses in the subsisting row, as illustrated, for example, in FIG. 16, which shows in section and under the same conditions as in FIG. 4 a part of a rib having a single row of recesses 3'.

In a modification, it is also possible to maintain the principle of the two rows of recesses, but alternating the recesses 3" and 4" of the two rows, in the manner shown by way of example in FIG. 17, under the same conditions as in FIG. 16.

The recesses of the different ribs of a slab preferably form parallel series of aligned recesses, but it is also possible for the recesses to be differently arranged for certain flooring purposes.

The elements which reinforce the slabs according to the invention have not been shown in the figures, it being understood that the invention does not relate to the manner in which the slabs are reinforced.

Although the present invention has been described

What is claimed is:

1. A prefabricated reinforced concrete flooring slab, comprising a compression bed and ribs projecting from one face of the compression bed, at least some of said ribs each having two longitudinal lateral faces and a plurality of recesses distributed at regular intervals along the rib, successive recesses along the rib opening on alternate ones of said faces, the walls of each recess converging from its outer end toward its inner end, and a base closing the inner end of each recess, said base being capable of destruction by a hammer blow to open said recess from one lateral face of the rib to the other.

2. Flooring slab according to claim 1, in which the section of a recess through a horizontal plane has the form of an isosceles trapezium, of which the sides are substantially inclined at 45° or more to the major base of the trapezium.

3. Flooring slab according to claim 1, in which each two successive recesses on a single rib have axes separated by an interval equal to half the interval which separates the longitudinal axes of two adjacent ribs.

4. Flooring slab according to claim 1, in which the compression bed has edges which comprise inclined faces.

5. Flooring slab according to claim 1, in which the compression bed has edges which comprise rough vertical faces.

6. Flooring slab according to claim 1, in which at least one rib is extended beyond the compression bed.

7. Flooring slab according to claim 6, in which only the part of the rib which is in the compression bed is extended.

8. Flooring slab according to claim 6, in which the rib is extended over its entire height.

9. Flooring slab according to claim 6, in which the part of the rib which is in the compression bed and a fraction only of the rib portion which projects relatively to the said bed are extended.

References Cited

UNITED STATES PATENTS

| | | | |
|---|---|---|---|
| 1,495,896 | 5/1924 | Ferguson | 52—602 |
| 1,554,144 | 9/1925 | Villard | 52—98 |
| 2,171,338 | 8/1939 | Henderson | 52—602 |
| 2,294,554 | 9/1942 | Henderson | 52—602 |
| 2,984,312 | 5/1961 | Brisley et al. | 161—116 |
| 3,263,378 | 8/1966 | Dorris | 52—100 |
| 1,514,714 | 11/1924 | Needham et al. | 52—602 |
| 1,764,134 | 6/1930 | Young | 52—100 |
| 1,959,816 | 5/1934 | Crum | 52—98 |
| 2,008,370 | 7/1935 | Schwalbe | 52—98 |

FOREIGN PATENTS

| | | | |
|---|---|---|---|
| 586,557 | 11/1959 | Canada | 52—602 |
| 827,035 | 2/1960 | Great Britain | 52—98 |
| 464,415 | 1914 | France | 52—602 |
| 411,294 | 11/1966 | Switzerland | 52—602 |

FRANK L. ABBOTT, Primary Examiner

JAMES LEE RIDGILL, SR., Assistant Examiner

U.S. Cl. X.R.

52—602